K. G. PETERSON.
AUTOMOBILE SPRING.
APPLICATION FILED DEC. 18, 1918.
1,362,037. Patented Dec. 14, 1920.
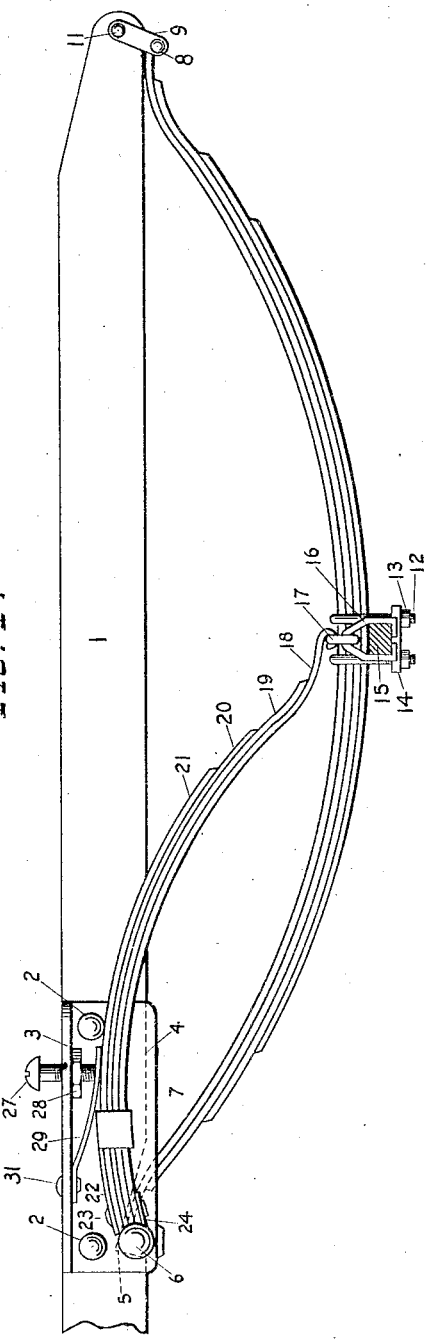
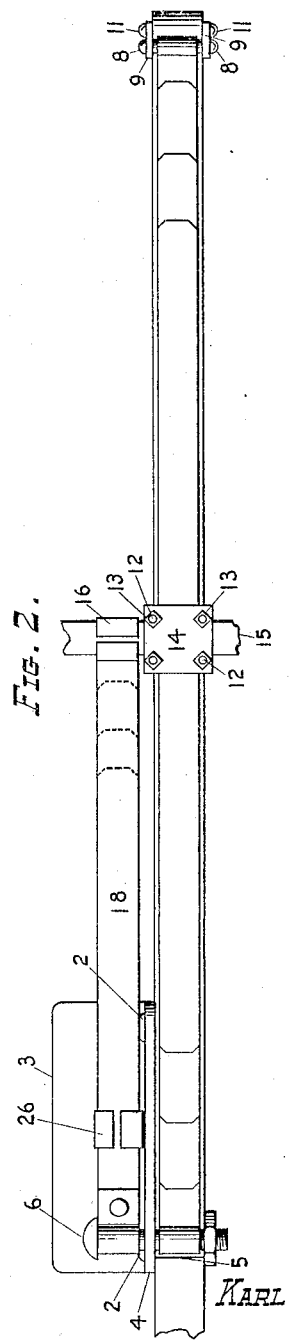
Inventor
KARL G. PETERSON
By Harry C. Schroeder
Attorney

UNITED STATES PATENT OFFICE.

KARL G. PETERSON, OF OAKLAND, CALIFORNIA.

AUTOMOBILE-SPRING.

1,362,037.   Specification of Letters Patent.   Patented Dec. 14, 1920.

Application filed December 18, 1918. Serial No. 267,293.

*To all whom it may concern:*

Be it known that I, KARL G. PETERSON, citizen of the United States, residing at Oakland, in the county of Alameda and State of California, have invented certain new and useful Improvements in Automobile-Springs, of which the following is a specification.

The present invention is an improvement in vehicle springs of the leaf type.

The principal object of the invention is to provide an auxiliary spring supplementing the conventional leaf spring and of such construction that it will receive a portion of the stress applied to said spring.

A further object is to provide a means of varying the degree of support afforded by the auxiliary spring, and of adjusting the resiliency of said auxiliary spring to compensate for the additional stress or load imposed by the vehicle carrying same.

These objects are accomplished in the novel structure described in the following specification and illustrated in the accompanying drawings in which, Figure 1 is a fragmentary view of an auto chassis showing my improved auxiliary leaf spring attached thereto.

Fig. 2 is an underneath plan view of same.

Referring to the drawings, 1 indicates a portion of the chassis of an automobile to which is secured by bolts 2 an angle iron having a horizontal member 3 and a vertical member 4. Through a mortise 5 in the chassis and a hole in the member 4 of the angle iron extends a bolt 6. Around that portion of the bolt 6 which extends through the mortise 5 of the chassis is bent one end of an upper leaf 7 of a series of laminated leaves composing a vehicle spring of usual structure. The opposite end of the upper leaf 7 surrounds a bolt 8 and is attached to the front end of the frame by links 9, through which extends a bolt 11.

The laminated leaves of the spring are held in alinement by means of two U-bolts 12 which surround the said leaves at the middle portion thereof and are held in locked engagement by means of nuts 13 below a keeper plate 14, beneath the axle 15, through holes in which extend the ends of the U-bolts 12.

Bent around the axle 15 is a link engaging strap 16 around the central top portion of which is a link 17 which also extends through a bent end of an under leaf 18 of a series of laminated leaves 18, 19, 20 and 21, comprisng an additional or auxiliary spring supplemental to the usual vehicle spring.

The opposite end of the leaf 18 is bent to surround that portion of the bolt 6 which extends beneath the member 3 of the angle iron and is pivoted on said bolt.

The leaves 19, 20 and 21 are kept in alinement with the leaf 18 by means of a keeper plate 22 which is secured by a rivet 23 extending through registering holes in the respective leaves to a plate 24 on the under surface of the spring 18.

The keeper plate 22 is of T-shape and the cross portions are bent downward at right angles to the horizontal member to form side keepers for limiting the lateral movement of the leaves and are in turn bent inwardly as shown at 26 underneath the leaf 18.

In order to provide a means of adjusting the auxiliary spring to any desired amount of reinforcement to the spring it complements, I have provided a turn bolt 27 threaded through a hole in the member 3 of the angle iron, extending through a lock nut 28, and bearing downwardly against a spring plate 29 riveted as shown at 31 at one end to member 3 of the angle iron.

It will be seen that when the driver of a vehicle deems the load excessive for his spring, he can screw down the bolt 27 forcing the auxiliary spring into compression and thereby greatly stiffening the vehicle spring proper and at the same time greatly lessening the danger of breakage by reason of the rebound, which is frequently a source of loss in springs now in use.

Having described my invention, what I claim as new and wish to secure by Letters Patent is:—

In combination with a vehicle axle, chassis and spring, a supplemental auxiliary spring pivoted at one end adjacent to one end of said vehicle spring, and at the other end to a link oscillatively connected to said axle or suitable support for the vehicle spring, and means for adjusting the tension of said auxiliary spring, comprising an L-shaped angle plate rigidly secured to a member of the chassis, a hole in said plate tapped to receive a threaded turnbolt adapted when turned in one direction to stiffen, depress and form a fulcrum for said auxiliary spring and when turned in the opposite direction to retract and decrease the resiliency of the auxiliary spring.

In testimony whereof I affix my signature

KARL G. PETERSON.